(12) United States Patent
Steinmeyer et al.

(10) Patent No.: US 9,435,989 B1
(45) Date of Patent: Sep. 6, 2016

(54) LIGHT PROCESSING SYSTEM

(71) Applicant: Focal Technologies, Inc., Portland, OR (US)

(72) Inventors: Donald Alan Steinmeyer, Silverdale, WA (US); Eric Robert Steinmeyer, Portland, OR (US); John Richard Zagelow, Portland, OR (US)

( * ) Notice: Subject to any disclaimer, the term of this patent is extended or adjusted under 35 U.S.C. 154(b) by 0 days.

(21) Appl. No.: 14/954,851

(22) Filed: Nov. 30, 2015

Related U.S. Application Data

(63) Continuation of application No. 14/192,832, filed on Feb. 27, 2014, now Pat. No. 9,201,228.

(60) Provisional application No. 61/851,039, filed on Feb. 27, 2013.

(51) Int. Cl.
| | |
|---|---|
| G02B 3/08 | (2006.01) |
| F24J 2/06 | (2006.01) |
| G02B 19/00 | (2006.01) |
| G02B 5/04 | (2006.01) |
| G01S 3/786 | (2006.01) |

(52) U.S. Cl.
CPC ......... *G02B 19/0042* (2013.01); *G01S 3/7861* (2013.01); *G02B 5/045* (2013.01); *G02B 19/0009* (2013.01)

(58) Field of Classification Search
CPC .... G02B 3/08; G02B 3/0031; G02B 3/0056; Y02E 10/43; Y02E 10/41; Y02E 10/46; Y02E 10/52; Y02E 10/50; F24J 2/085; F24J 2/06; F24J 2/062; F24J 2/542; F24J 2/541; F24J 2/5424; F24J 2/5427; H01L 31/0232; H01L 31/052; H01L 33/58

USPC ............. 359/742, 743, 546, 726, 741, 853; 250/492.1, 504 R, 492.3

See application file for complete search history.

(56) References Cited

U.S. PATENT DOCUMENTS

| | | | |
|---|---|---|---|
| 3,739,455 A | 6/1973 | Alvarez | |
| 3,875,926 A * | 4/1975 | Frank | C02F 1/14 122/366 |
| 4,011,857 A * | 3/1977 | Rice | F24J 2/085 126/674 |
| 4,112,142 A | 9/1978 | Schroder et al. | |
| 4,134,393 A * | 1/1979 | Stark | B01D 5/0066 126/581 |
| 4,135,985 A | 1/1979 | La Rocca | |

(Continued)

OTHER PUBLICATIONS

J.M. Monteagudo et al., Fresnel lens to concentrate solar energy for the photocatalytic decoloration and mineralization of orange II in aqueous solution, Chemosphere 65, 2006, p. 1242-1248.*

(Continued)

*Primary Examiner* — David A Vanore
(74) *Attorney, Agent, or Firm* — Kolisch Hartwell, P.C.

(57) ABSTRACT

A system is provided for photo-processing of a material using incident light with an optical element that includes a plurality of concentric bands of optical prisms concentric around a focal axis. The system includes a target receiver positioned on the focal axis and holds the material to be photo-processed. The optical prisms concentrate incident light on the target receiver. The system may include a tracking assembly for orienting the optical element toward the source of the incident light. The optical prisms may be selected in accordance with Snell's Law of Refraction. The system may include a delivery mechanism for delivery of semisolid and granular material for processing.

20 Claims, 12 Drawing Sheets

(56) References Cited

U.S. PATENT DOCUMENTS

| | | | |
|---|---|---|---|
| 4,194,949 A * | 3/1980 | Stark | B01D 3/00 126/634 |
| 4,210,121 A * | 7/1980 | Stark | B01D 3/00 126/573 |
| 4,229,184 A | 10/1980 | Gregg | |
| 4,240,210 A | 12/1980 | Huang | |
| 4,244,683 A | 1/1981 | Rowland | |
| 4,267,021 A * | 5/1981 | Speros | C02F 1/14 126/674 |
| 4,267,823 A | 5/1981 | Bohg et al. | |
| 4,297,521 A * | 10/1981 | Johnson | F24J 2/06 126/605 |
| 4,302,105 A * | 11/1981 | Sick | G01N 21/8903 250/224 |
| 4,440,155 A * | 4/1984 | Maloof | F24J 2/062 126/570 |
| 4,456,344 A | 6/1984 | Bordignon | |
| 4,530,736 A | 7/1985 | Mutter | |
| 4,549,528 A | 10/1985 | Gibson | |
| 4,643,752 A | 2/1987 | Howard et al. | |
| 4,645,523 A * | 2/1987 | Howard | G02B 3/08 264/1.7 |
| 4,755,921 A | 7/1988 | Nelson | |
| 4,834,840 A | 5/1989 | Capella | |
| 4,848,087 A * | 7/1989 | Parker | F03G 6/065 126/678 |
| 4,848,319 A | 7/1989 | Appeldorn | |
| 4,882,071 A | 11/1989 | Bench et al. | |
| 4,892,664 A | 1/1990 | Miller | |
| 4,904,069 A | 2/1990 | Nakata | |
| 5,043,080 A | 8/1991 | Cater et al. | |
| 5,049,177 A | 9/1991 | Nakata | |
| 5,439,652 A | 8/1995 | Sczechowski et al. | |
| 5,476,906 A | 12/1995 | Yokoo et al. | |
| 5,555,878 A * | 9/1996 | Sparkman | F24J 2/055 126/652 |
| 5,601,382 A * | 2/1997 | Corte | B09C 1/06 405/128.6 |
| RE35,534 E | 6/1997 | Claytor | |
| 5,639,936 A | 6/1997 | Corte | |
| 5,656,209 A | 8/1997 | Benz et al. | |
| 5,758,938 A | 6/1998 | Osterwisch | |
| 5,770,122 A | 6/1998 | Curchod | |
| 5,870,233 A | 2/1999 | Benz et al. | |
| 5,976,423 A | 11/1999 | Buazza | |
| 6,037,289 A | 3/2000 | Chopin et al. | |
| 6,046,855 A * | 4/2000 | Goto | B29D 11/00278 359/619 |
| 6,073,500 A * | 6/2000 | Jorgensen | G01N 17/004 126/573 |
| 6,074,196 A | 6/2000 | Shimizu et al. | |
| 6,187,844 B1 * | 2/2001 | Murata | C08G 18/3876 524/196 |
| 6,331,058 B1 | 12/2001 | Lipscomb et al. | |
| 6,399,874 B1 * | 6/2002 | Olah | F24J 2/085 136/246 |
| 6,415,783 B1 | 7/2002 | Harrison | |
| 6,468,434 B2 | 10/2002 | Pappa et al. | |
| 6,557,804 B1 * | 5/2003 | Carroll | B64G 1/007 126/605 |
| 6,633,042 B1 | 10/2003 | Funken et al. | |
| 6,649,328 B2 | 11/2003 | Ono et al. | |
| 6,663,953 B2 | 12/2003 | Kamiya et al. | |
| 6,678,097 B2 * | 1/2004 | McKenney | B29C 33/302 359/546 |
| 6,700,054 B2 * | 3/2004 | Cherney | F03G 6/003 126/569 |
| 6,702,145 B2 | 3/2004 | Malcolm | |
| 6,804,062 B2 | 10/2004 | Atwater et al. | |
| 6,804,065 B2 | 10/2004 | Kono | |
| 6,963,450 B2 | 11/2005 | Kouno | |
| 6,988,809 B2 * | 1/2006 | Rabinowitz | F24J 2/10 359/851 |
| 7,133,183 B2 * | 11/2006 | Rabinowitz | F24J 2/16 345/107 |
| 7,156,088 B2 * | 1/2007 | Luconi | F24J 2/16 126/684 |
| 7,192,146 B2 * | 3/2007 | Gross | F24J 2/38 359/853 |
| 7,206,142 B1 * | 4/2007 | Wagner | F24J 2/085 359/741 |
| 7,247,790 B2 * | 7/2007 | Rabinowitz | F24J 2/16 136/243 |
| 7,251,084 B2 * | 7/2007 | Shimura | F21V 5/045 359/742 |
| 7,628,017 B2 | 12/2009 | Montesinos | |
| 7,701,648 B2 | 4/2010 | Amano et al. | |
| 7,736,007 B2 * | 6/2010 | Rabinowitz | F24J 2/16 126/600 |
| 7,789,650 B2 | 9/2010 | Johnson | |
| 7,789,651 B2 | 9/2010 | Johnson | |
| 7,866,836 B2 * | 1/2011 | Rabinowitz | F24J 2/085 126/600 |
| 7,884,279 B2 * | 2/2011 | Dold | F24J 2/5424 136/243 |
| 8,042,337 B2 * | 10/2011 | Hong | F24J 2/38 123/577 |
| 8,101,896 B2 * | 1/2012 | Alenizi | F24J 2/38 250/203.4 |
| 8,104,465 B2 | 1/2012 | Kribus et al. | |
| 8,522,772 B1 * | 9/2013 | Olsen | F24J 2/125 126/600 |
| 2002/0071187 A1 | 6/2002 | Kono | |
| 2002/0094495 A1 | 7/2002 | Ono et al. | |
| 2002/0183811 A1 | 12/2002 | Irwin | |
| 2006/0198033 A1 | 9/2006 | Soyama et al. | |
| 2008/0117522 A1 | 5/2008 | Santander Cerbell | |
| 2008/0150175 A1 | 6/2008 | Johnson | |
| 2008/0150179 A1 | 6/2008 | Johnson | |
| 2008/0204901 A1 | 8/2008 | Amano et al. | |
| 2009/0188545 A1 | 7/2009 | Rabinowitz | |
| 2010/0154863 A1 * | 6/2010 | Bennett | H01L 31/0547 136/246 |
| 2010/0165489 A1 * | 7/2010 | Tobita | G02B 3/08 359/742 |
| 2010/0226022 A1 * | 9/2010 | Shen | G02B 3/08 359/742 |
| 2011/0011390 A1 | 1/2011 | Lafontaine et al. | |
| 2014/0225002 A1 * | 8/2014 | Blatchley, III | C02F 1/325 250/430 |

OTHER PUBLICATIONS

Feb. 26, 2015, Office action from the U.S. Patent and Trademark Office in U.S. Appl. No. 14/192,832, the application to which this application claims the benefit of priority.

* cited by examiner

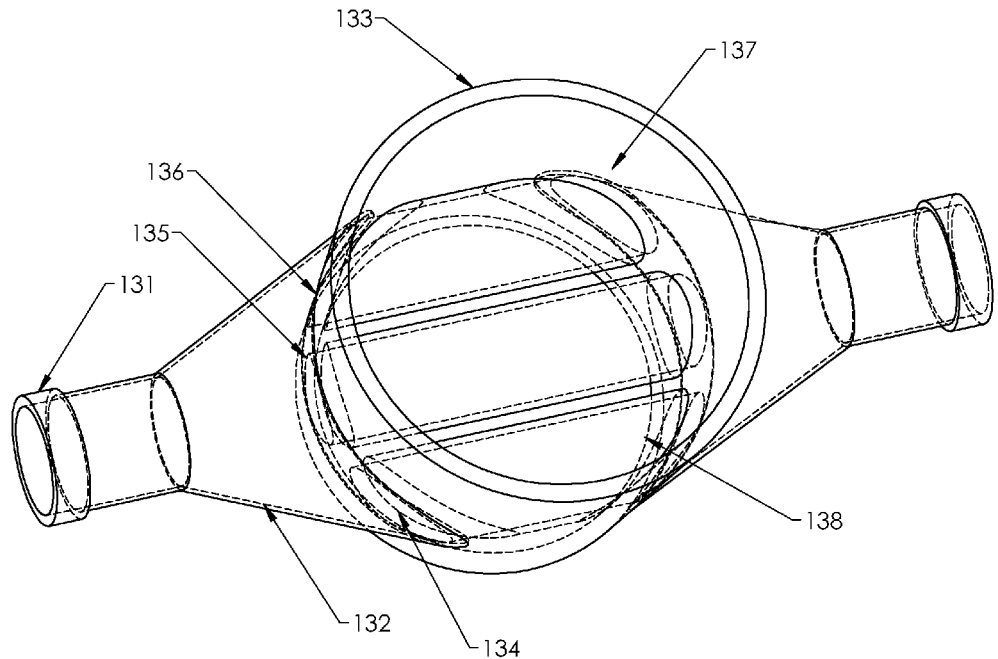
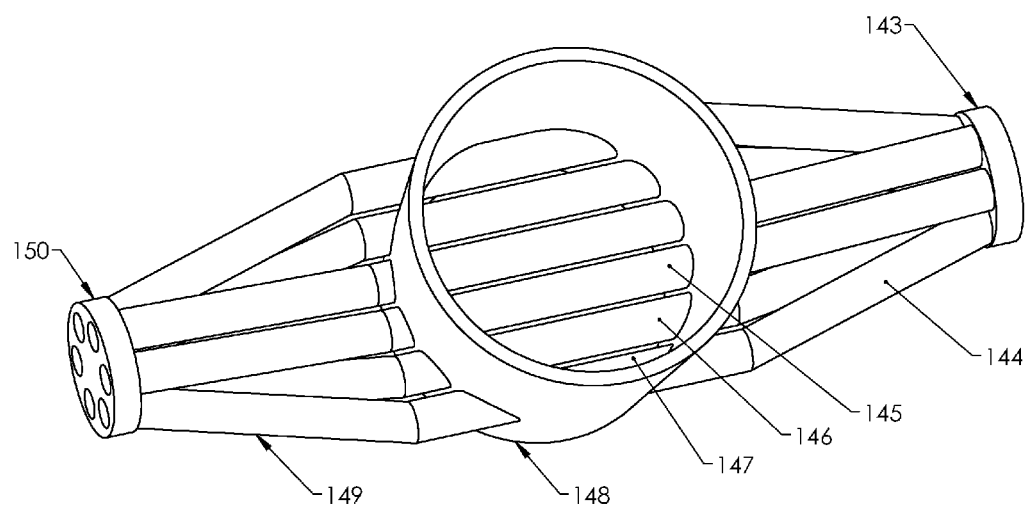

FIGURE 7
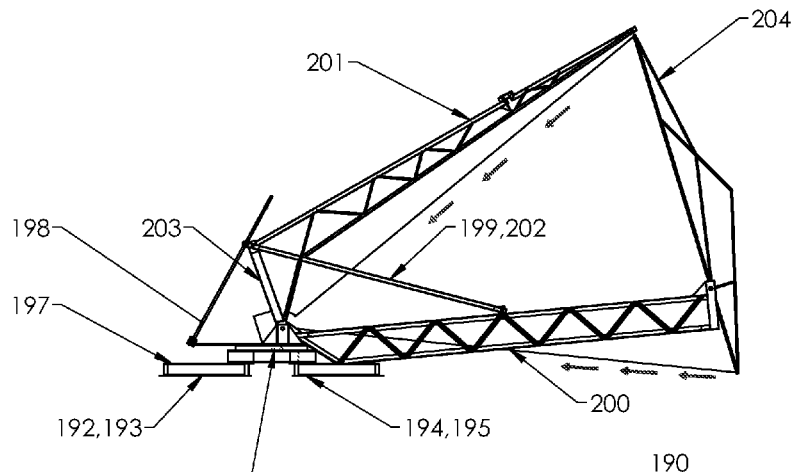
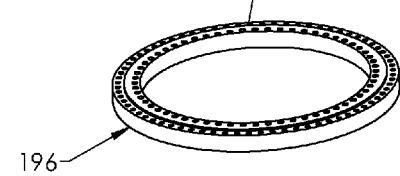
FIGURE 7a
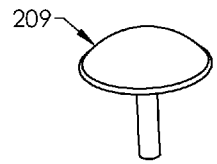
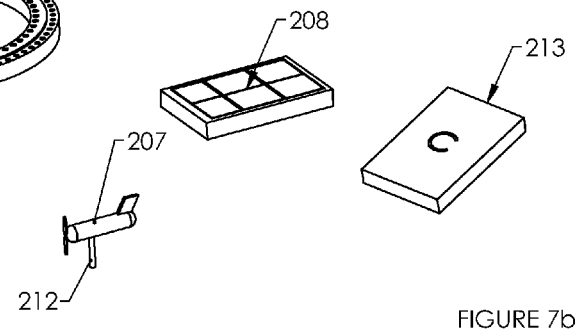
FIGURE 7b
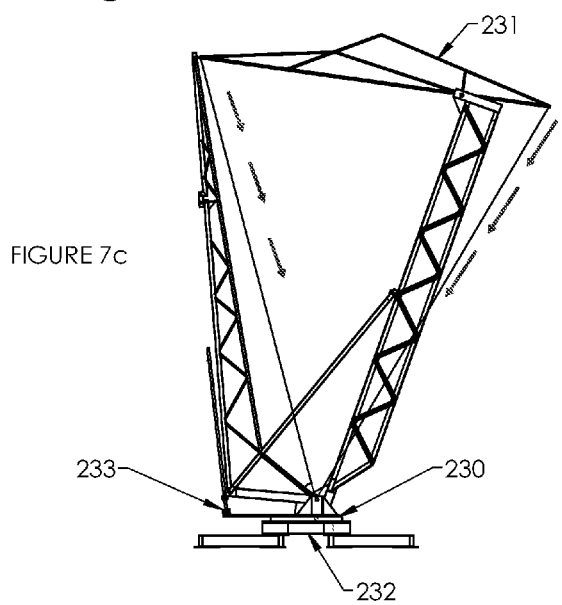
FIGURE 7c
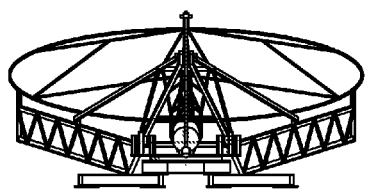

FIGURE 9
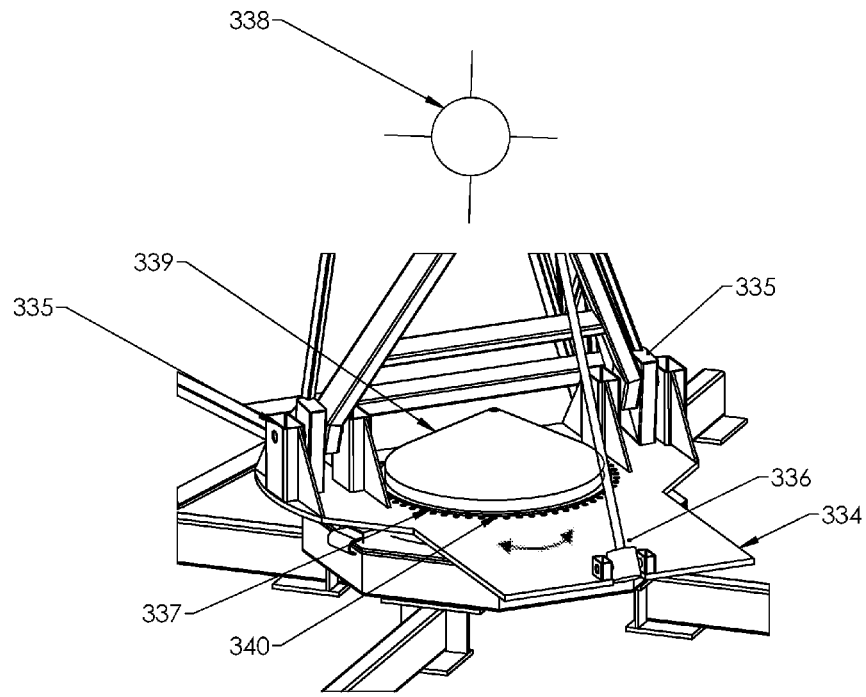
FIGURE 9a
FIGURE 9b
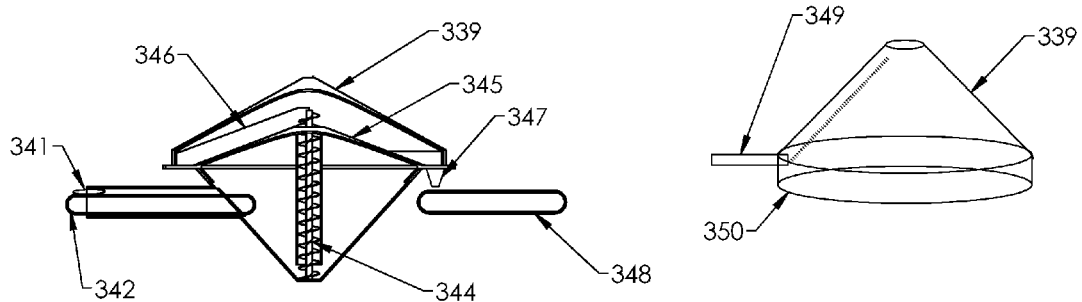

STOWED POSITION

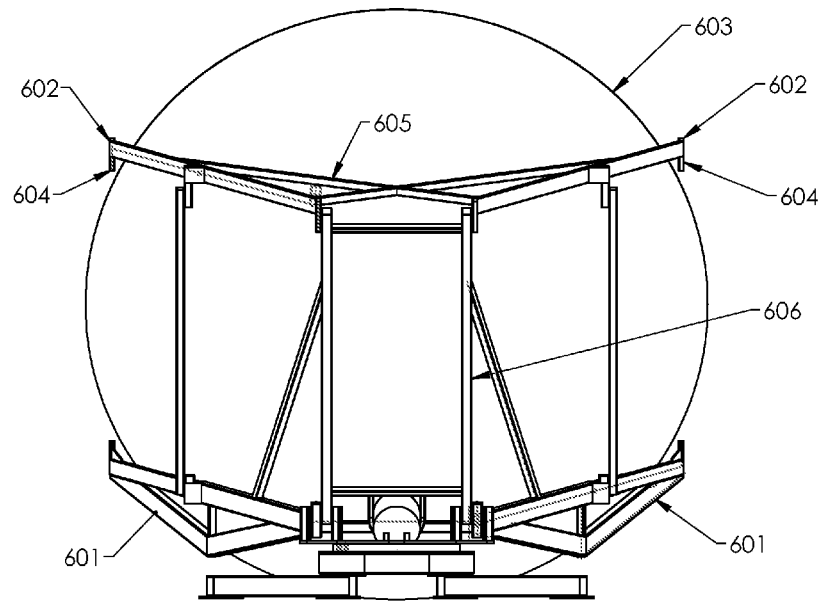
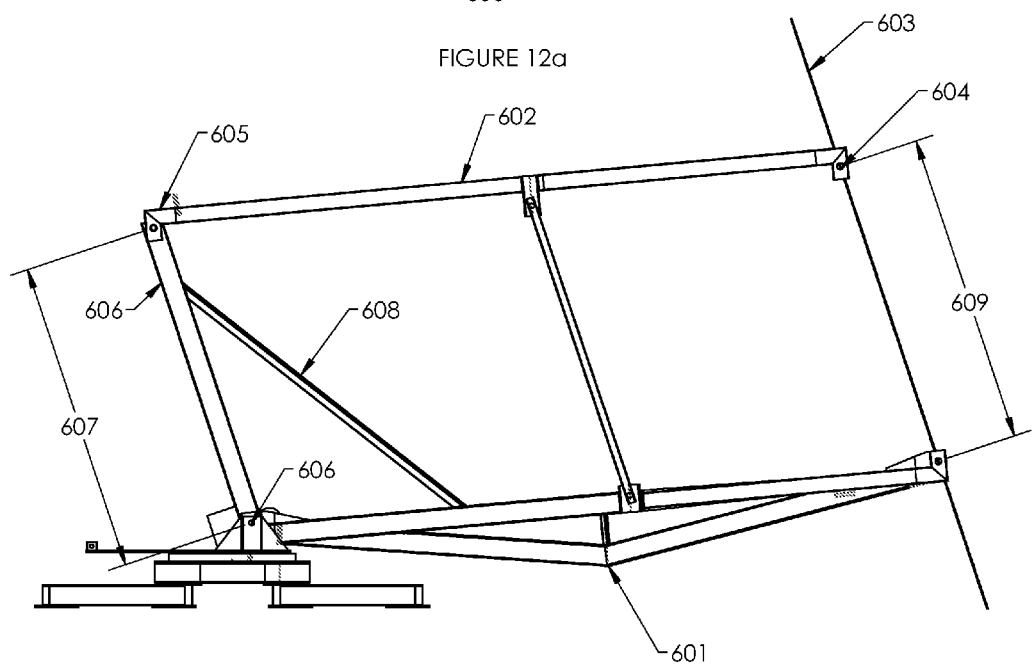

LIGHT PROCESSING SYSTEM

CROSS-REFERENCE TO RELATED APPLICATION

The present application is a continuation of U.S. patent application Ser. No. 14/192,832, filed Feb. 27, 2014, which claims priority from U.S. Provisional Patent Application Ser. No. 61/851,039, entitled Large Two Axis Solar Concentrator Using Refracting Optics and filed Feb. 27, 2013, both of which are incorporated by reference herein.

BACKGROUND

Highly concentrated solar energy has many advantages for application to industrial processes. These processes typically utilize the concentrated energy for heat generation. Also, the unique solar spectrum has been shown to be effective in processes such as decontamination, at both low and high concentrations.

Typical solar energy concentrating devices however are not ideally configured for these applications. Reflecting, or mirrored concentrators such as central receiver systems and parabolic dishes place the concentrated energy above the reflector, and high above the ground. The receiver on a parabolic dish constantly moves as the sun is tracked. These geometries complicate supplying and retrieving materials, liquids, and solids to be processed and cannot be used for irradiating a stationary site at ground level.

Furthermore, the highest energy solar energy wavelengths, the UV, are absorbed by otherwise efficient reflective surfaces, such as those employed in typical solar applications and are therefore not present in the concentrated energy. Although UV is a small content of the available solar spectrum, it has the highest destructive energy. Wavelengths in the 300-nanometer range have been shown to be 200 times more energetic, or destructive, than visible light at 500 nanometers. Additionally, photo-catalytic processes, which may be used for industrial applications require UV for activation. These wavelengths are not available from mirrors. If available, these wavelengths may be utilized to break down organic contaminates and materials, either directly, or in a photo-catalytic manner.

Lastly, use of solar energy for industrial processes requires large area concentration to achieve sufficient energy and temperatures. Circular refracting optics required for high concentration solar applications has heretofore been limited in size by the design and manufacturing process for the prism surface. Moreover, large solar concentrators are subject to high wind loads during operation and when idle.

Ultra Violet C from 100 nm to 280 nm is almost completely absorbed by ozone, and other atmospheric gases and conditions, and ultra violet B from 280 nm to 315 nm is also largely absorbed. Longer than visible wavelengths including Infra red B are also attenuated. However, significant wavelength selective photon flux density remains to impinge on an apparatus and be operated on through transmission and thereby refractive operations on distinct wavelength groups to be processed through concentration to drive photo-thermal, photo-chemical, and photo-catalytic processes.

BRIEF SUMMARY

A large two axis tracking solar concentrator may use circular refracting optics optimized for industrial applications. First, the refracting optics may be positioned between the sun and the concentrated energy receiver as the sun is tracked. This allows the concentrated energy to occur at or near the ground. This also provides a continuously accessible receiver with a minimum path for fluid supply and return lines for fluids processing with the solar energy, which may be desired for industrial applications. Additionally, this allows for an efficient processing of solids in the concentrated solar energy. The design allows for minimum movement of the receiver with the tracking system and also allows the radiated area to be stationary and the refractor to track around it for some applications.

Second, a solar concentrator may incorporate materials in the refracting element which have been selected to pass the UV, and therefore to concentrate the UV.

Effective use of solar energy with industrial processes may be improved by maximizing the concentrated energy available. A large solar refracting area in each unit may make use of a certain prism design and fabrication approach. As the diameter of the refractor increases, the width of the individual prisms may be increased. The number of prisms required may be reduced, which would reduce the optical loss from the points and valleys of the prisms and would simplify the manufacturing process.

Refractors using the methods of this disclosure may preferably be made in a range of between about 8-feet in diameter and about 40-feet in diameter. Larger and smaller refractors may also be provided in accordance with the present disclosure In some configurations wind loads may be minimized by open passages in the refractor surface. A survival stow mode may be provided, which places the array near, and/or horizontal, to the ground. This may reduce loads and may be used for winds above the operational limits. This mode may also be utilized for assembly of the unit.

A preferred optics material for the refracting optics is cell cast acrylic, which typically provides for durability and optical clarity suitable to applications of the present disclosure. Preferably, a form of acrylic which passes the UV, typically used in applications such as body tanning beds, is used. Such acrylic may be selected, according to particular applications of the present disclosure, from such companies as Evonik Cyro and Lucite.

The concentrator assembly may interface with a receiver and a materials processing system for processing fluids or gasses. One embodiment of the present disclosure provided for decontamination of fluids utilizing photocatalytic reaction in the receiver, and subsequent decay in a tank system.

Additional embodiments of the present disclosure provide for processing solids with a delivery and removal system in the focal area of the concentrator.

According to one embodiment of the present disclosure, a method and apparatus may provide for collecting electromagnetic radiation from the sun (2) at or near the earth's surface. The radiation collected may include short wavelengths such as ultra violet B starting at 280 nm through the visible spectrum extending to infra red B 1400 nm to 3000 nm. The method and apparatus provide for directing those incident photons, in a controlled concentration through selected refraction that selects power density and monochromatic distribution, upon a receiver, along a focal axis to convert that impinging quanta into useful work.

According to an embodiment of the present disclosure, a method and apparatus may provide for capturing and optically processing incident solar photon flux with a refractive array toward a specialized receiver for photo-thermal, photo-chemical, photo-catalytic, and photo-voltaic utility applications using short-wavelengths including UVB, UVA, Visible, IRA, and IRB wavelengths to drive endothermic and photo reactive processes.

According to an embodiment of the present disclosure, a method and apparatus may provide a means of collecting impinging solar energy photons that minimizes surface reflection.

According to an embodiment of the present disclosure, a method and apparatus may concentrate and control impinging solar energy of selected wavelengths from UV B through IR B and concentrate wavelength groups onto a target with controlled, and selected power density and chromatic distribution upon a receiver.

According to an embodiment of the present disclosure, a method and apparatus may provide for deploying, housing and irradiating a receiver that collects processed optical energy from the collector and converts that optical photon flux energy to photo-thermal energy operating on a working fluids, solids, and gasses either for space heating, fluid heating, process heat production and decontamination.

According to an embodiment of the present disclosure, a method and apparatus may provide for mechanically deploying and orienting a structure toward the solar disk with high accuracy from 0.75 to 1.5 degrees through diurnal procession.

According to an embodiment of the present disclosure, a method and apparatus may provide for managing energy transfer from intermittent solar sources to continuous conversion by a selected receiver for photo-thermal, photo-chemical, and photo-catalytic reactions.

According to an embodiment of the present disclosure, a method and apparatus may provide for sensing, sampling, wireless reporting and controlling a structure using remote data sensors including pyrometers, wind sensors, solar insolation sensors including system sensors under programmable logic control.

According to an embodiment of the present disclosure, a method and apparatus may provide for concentrating solar energy into receivers that drive photo-chemical, photo-catalytic, and photo-thermal processes that oxidize organic pollutants into degradation products directly with ultra-violet radiation from 280 nm and with thermal gain.

According to an embodiment of the present disclosure, a method and apparatus may provide for collecting and directing impinging solar rays toward a receiver that receives high photon flux density for photolysis, and other photo-chemical and photo-catalytic reactions and processes.

According to an embodiment of the present disclosure, a method and apparatus may provide for mechanically supporting a structure with micro-control of orientation with mechanical strength to bear variable and extended wind loads, in active, and stowed positions of Azimuth and Altitude control, chemical corrosion, and other environmental degradation factors in the field.

According to an embodiment of the present disclosure, a method and apparatus may provide for interchangeable optical receivers that perform specific functions including photo-thermal, photo-chemical and photo-catalytic work.

According to an embodiment of the present disclosure, a method and apparatus may provide for driving endothermic chemical, and physical reactions using concentrated solar photon flux using refractive arrays.

According to an embodiment of the present disclosure, a method and apparatus may provide for controlling working fluids, and subjecting those working fluids, and materials as solids and suspended solids to high photon flux densities that are wavelength selective.

According to an embodiment of the present disclosure, a method and apparatus may provide for control of impinging solar radiation of polychromatic nature and processing that incident quanta into monochromatic groups that are selected and controlled onto a target plane across focal planes, and centered on the focal axis of the structure to perform photo-thermal, photo-chemical and photo-catalytic work.

According to an embodiment of the present disclosure, a method and apparatus may provide for large amounts of concentrated solar energy photon flux density in a fixed location, at, or near ground level.

According to an embodiment of the present disclosure, a method and apparatus may provide for large concentrations from 5 suns to 500 suns of selectable high photon flux density at a stationary location at, or near, ground level through the diurnal cycle.

According to an embodiment of the present disclosure, a method and apparatus may provide a large refractor without requiring diamond, or precision cutting to obtain an optical surface, or surfaces.

According to an embodiment of the present disclosure, a method and apparatus may provide for large radius refractive solar concentrators, radius from 1 meter to 20 meter refractive array by controlling refracted rays directed to, or near the selectable focal plane.

According to an embodiment of the present disclosure, a method and apparatus may provide for driving photo-catalytic processes in a reaction chamber, initiating processes that continue to be active outside the focal reaction chamber, through time, using photo-thermal, and photo-chemical processes to drive ongoing chemical and physical reactions in the working fluids, solids, and gasses.

According to an embodiment of the present disclosure, a method and apparatus may provide for driving photo-catalytic, and photo-chemical processes that continue photo-thermal and chemical decontamination of working fluids, solids, and gasses, outside the photo reactor that are sampled and selectively redirected, and cycled through the photo reaction chamber and to thermal storage tanks for time dependent chemical and physical reactions for decontamination applications.

According to an embodiment of the present disclosure, a method and apparatus may provide for selectively concentrating the highest destructive wavelengths of the solar spectrum for process applications.

According to an embodiment of the present disclosure, a method and apparatus may provide for use of concentrated selected short-wavelength ultra-violet radiation increasing photo-catalytic, photo-chemical, photo-thermal and photo-voltaic reaction rates through concentration by refraction, greatly increasing ultra-violet radiation photon flux densities available for processes.

According to an embodiment of the present disclosure, a method and apparatus may provide for utilizing solar energy for process applications with energy capture and application efficiencies above 50%.

According to an embodiment of the present disclosure, a method and apparatus may provide for concentrating incident solar energy into selectable wavelength groups including but not limited to ultra-violet, visible, and infra-red radiation that may be selected, or excluded, from reaching any point of the receiver, driving processes that have selected wavelength response characteristics, and band-gap characteristics, singularly or together, in a specialized receiver configured to receive and utilize selected wavelength groups for photo-thermal, photo-catalytic, photo-chemical and photo-voltaic work.

BRIEF DESCRIPTION OF THE SEVERAL VIEWS OF THE DRAWINGS

FIG. 1a illustrates refraction of light rays from the sun according to an embodiment of the present disclosure.

FIGS. 5 and 5a are views of a receiver according to embodiments of the present disclosure.

FIGS. 7, 7a, 7b, and 7c are views of systems for controlling the position of an optical element according to embodiments of the present disclosure.

FIGS. 9, 9a, and 9b are views of an optical element and a receiver according to embodiments of the present disclosure, with incident light rays from the sun, for processing materials.

FIGS. 10, 11, 11a, 12, and 12a are views of systems for controlling the position of an optical element according to embodiments of the present disclosure.

DETAILED DESCRIPTION

The refracting optics of embodiments of the present disclosure may use specially processed acrylic which passes, rather than absorbs UV radiation. Typically, this is not available with reflecting mirrors. Anti reflective additives may be used to increase the energy passed through the acrylic.

An embodiment of the present disclosure may use refraction producing circular ring images. For some refractor elements or prisms at small radius from the center, the turning angle is normally small enough that chromatic spread is insignificant. However, with selective angles and focal length, spread can be induced. In some instances, the solar disk may be concentrated as individual circles, rather than a continuous ring. This capability typically becomes more pronounced as the prism radius from the center is increased, and the turning angle increases. Uniquely shaped rather than sequential shaped prisms may provide this capability. Further, the receiver is preferably not a plane, but rather a three dimensional area which can contain the "zone of confusion" produced by refraction from a multitude of prisms. And further, the chromatic spread allows selecting the highest energy rays for concentration and discarding the low energy infrared, with little loss of efficiency.

Figure 1:
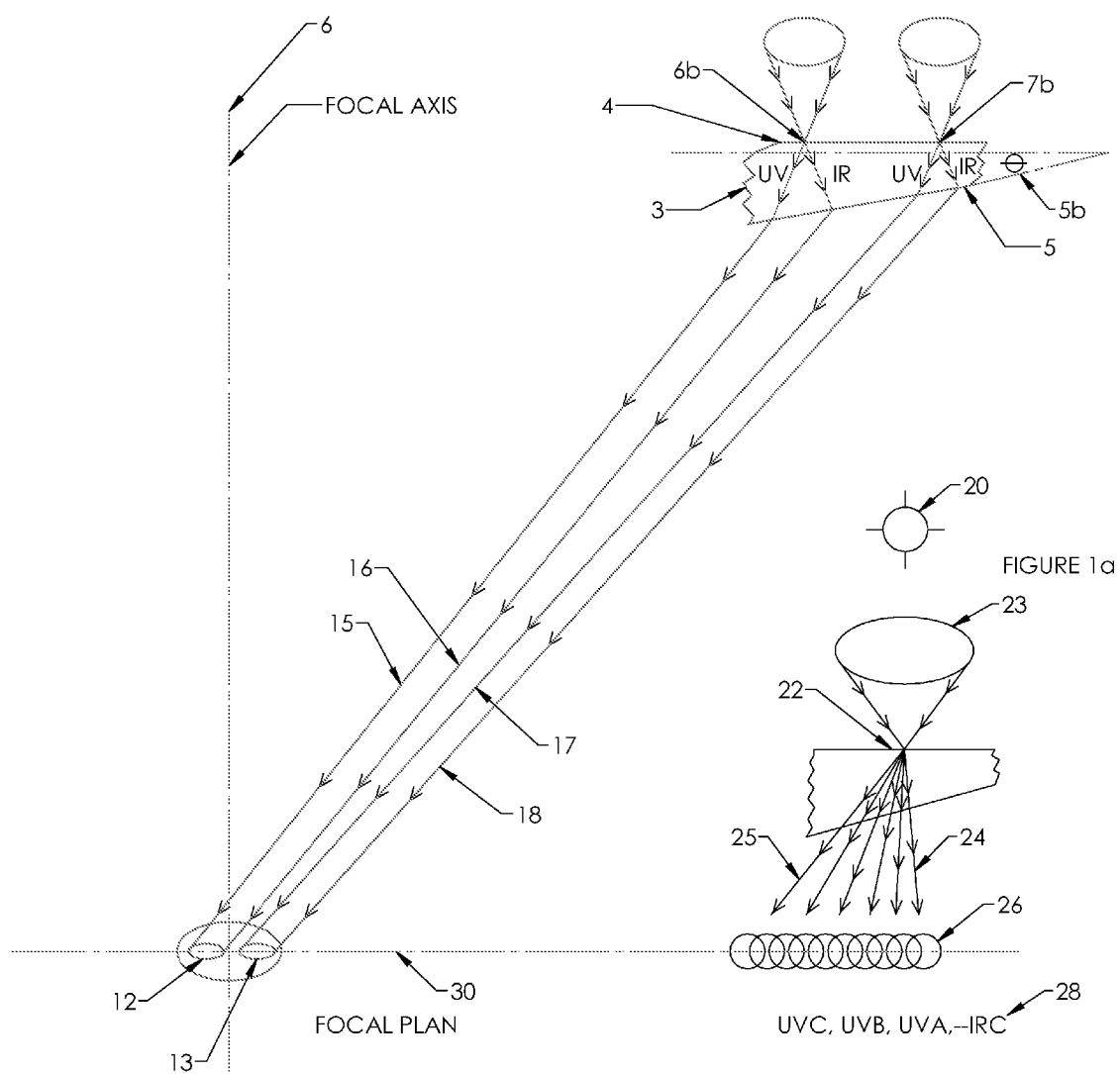
FIG. 1 is a view of an optical element and a receiver according to an embodiment of the present disclosure, with incident light rays from the sun.

As shown in FIG. 1, a system (1) shows one of a plurality of optical elements (3), in a cross-section view, which elements may share a common radius with a common focal axis (6) and operate on solar radiation impinging at a substantially normal angle.

Embodiments of the present disclosure may include a plurality of fresnel prisms formed with a surface that is preferably directed at a substantially normal angle to the sun (2). The sun projects a disk, and from a point (6b) on the receiving surface of the refractive elements, a cone of light is received with extreme rays coming from edge points on the sun's disk (2) and a mid-point set of rays that are polychromatic coming from the geometric center point. The sun projects direct rays and edge-skew rays. As the sun is a disk of 0.5 degrees of arc, the edge-skew rays have an average deviation of 0.25 degrees of arc. Embodiments of the present disclosure preferably control chromatic aberration.

The acting element (3), such as an optical prism, is shown with a point (6b) at a distinct radius from the focal axis (6). A further point (7b) is shown as an endpoint defining a distance between (6b) and (7b) where incident cones of solar radiation impinging from solar irradiance are directed toward a focal plane (30) along the focal axis (6). As solar radiation from the first incident cone at (6b) impinges on the element, radiation of different wavelengths follow different paths through the optical element (3) according to Snell's Law of Refraction. The optical prism (3) preferably has a material of selected optical index and is formed with an exit surface (5) that has a turning angle (5b) as defined as the angle the exit surface (5) makes with the orthogonal radius (8b) to the focal axis of the optical element.

In an embodiment of the present disclosure, solar energy incident onto receiving surface (4) which is directed at a normal angle, or near normal angle to the sun, and through a plurality of surfaces, of distinct radius and turning angle form an optical system that is concentric along a focal axis (6) and include a plurality of concentric bands of different optical elements with distinct turning angles, including but not limited to (5b) operate on incident wavelengths to concentrate and intensify the power density of said rays onto a target receiver along the focal axis (6) to perform a plurality of functions including but not limited to driving photo-thermal, photo-chemical, and photo-catalytic processes on selected liquids, gases, solids, or combinations thereof.

Photons of the optical cone of impinging light (6b) upon the surface (4) transmit through the optical material of the element (3), following Snell's Law of Refraction, and exit the optical facet through exit surface (5) at discrete locations as a function of wavelength. Photons that exit the optical element surface (5) have an extreme short wavelength ray (15) and an extreme long wavelength photon (16) with intermediate rays in between. Solar radiation cones impinging optical element (3) at point (7b) a discrete radius from impinging point (6b) have an extreme short wavelength photon (17) and an extreme long wavelength photon (18), respectively.

Extreme rays (15), (16), (17), and (18), respectively, exiting the optical elements are directed toward the receiver target location along a focal plane (30), with a center point C, (13) oriented at the center of the receiver (12) along the focal axis (6). Extreme rays (15) and (16) resolve on one side of the receiver, with the extreme ray (17) and extreme ray (18) resolving on the opposite side of the center point (13). With selective turning angles, both short wavelength and long wavelengths may be resolved on the same side of center, separated by the Snell refraction laws. Integrating around a plurality of optical elements oriented at discrete radius and turning angles, discrete optical bands may direct impinging radiation onto the receiver target within a focal plane, and may intermix incident wavelengths at the point of maximum concentration ratio.

As illustrated in FIG. 1a, the sun has an apparent image, from the earth's surface of a disk with approximately 0.5 degrees of arc. The resulting cone of light (23) from sun disk (20) impinge the optical element at point (22), which is at one segment, among a plurality of segments that comprise the optical system in aggregate. The optical element processes incident wavelengths of photons, as Snell's Law of Refraction describes, and preferably projects successive monochromatic images of the sun onto the target, with a midpoint ray directed specifically to the center of the target location on the receiver along the focal axis. The optical element operates on incident polychromatic radiation from the sun and processes said radiation from extreme short wavelength ray (25) to extreme long wavelength ray (24) and resolves these bands onto a target (26) as a distinct distribution of wavelength groups (28) across the target for a selected optical element. An embodiment of the present disclosure uses a refractive array to collect, optically process, and to direct impinging rays in a controlled manner to the specific receiver to drive photo-thermal, photo-chemical, and photo-catalytic processes.

Figure 2:
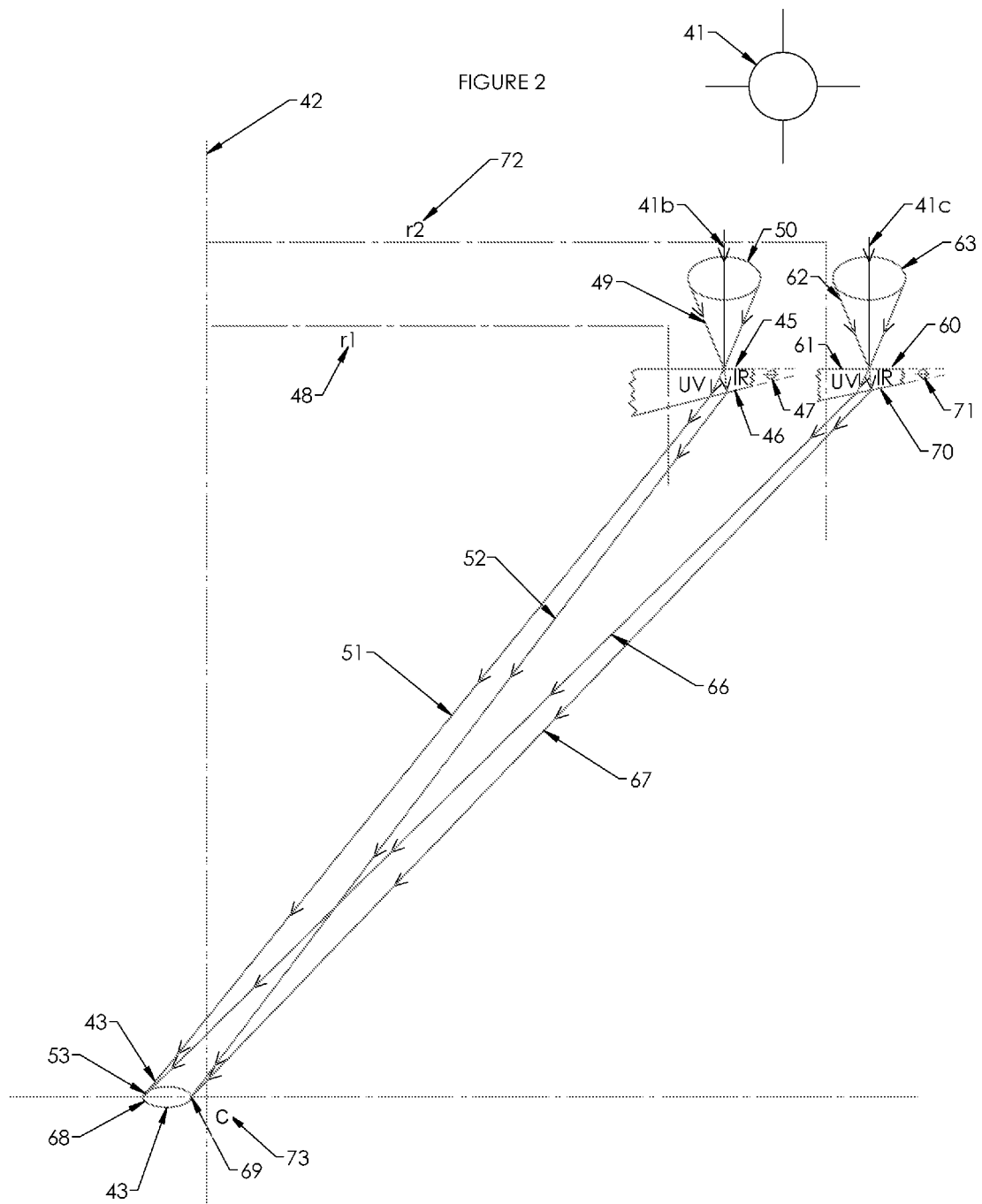
FIG. 2 is a view of an optical element and a receiver according to an embodiment of the present disclosure, with incident light rays from the sun.

Those learned in the art will appreciate, the apparatus (40) as shown in FIG. 2, may provide for optical operations on distinct impinging quanta of short, long and intermediate wavelengths so as to be concentrated and processed spectrally to provide control along a focal axis (42) and to resolve those distinct chromatic distribution patterns of monochromatic solar disks, or sections of disks, that exit the optical elements (44) and (61) and resolve on a focal plane (73) with center point along the focal axis (42). In aggregate the optical elements (44) and (61) operate in plurality as concentric refractive array about the focal axis (42).

Optical element (44), and optical element (61) may be provided with discrete radiuses (48) and (72), and discrete turning angles (47) and (71), respectively. As a plurality of optical elements, this embodiment of the present disclosure may use a plurality of fresnel zones to operate optically on directed incident radiation at normal angle from the solar disk. Solar radiation (41) from the solar disk impinges on optical element (44) along the entrance surface (45) as a cone with mid ray (41b) and edge rays (49) and (50), respectively, that impinge at normal, or near normal angles, and are refracted into a short wavelength cone with extreme ray (51) exiting surface (46) and long wavelength ray (52) exiting surface (46), directed toward the focal axis (42) along a selected focal plane (43) toward a receiver element (68).

Optical element (61) may operate as one of a plurality of fresnel zones to form a concentric refractive array about the focal axis (42) and to produce extreme short wavelength rays (66) and long wavelength rays (67) that resolve their monochromatic images of the solar disk along the target receiver. The present embodiment resolves the extreme short rays (51), and (66), respectively to the opposite side of the target location on the receiver (43) and resolves the extreme long wavelength rays (52), and (67), respectively, on the near side. The mid ray which is selected to be the numeric average between the extreme rays for each optical element may be directed either to the center point C, (73) of the target ring on the receiver (43) or to a point displaced from center, as is suitable for a particular application. For an optical collector that is a stepped refractive array, monochromatic projections of the solar disk may be projected as opposites along the target (68) resulting in short wavelength disks (53) extending to long wavelength disk (69) with mid ray on target point (73). Integrating over the whole rotation the wavelengths are distributed isotropically across the target area (68).

Figure 3:
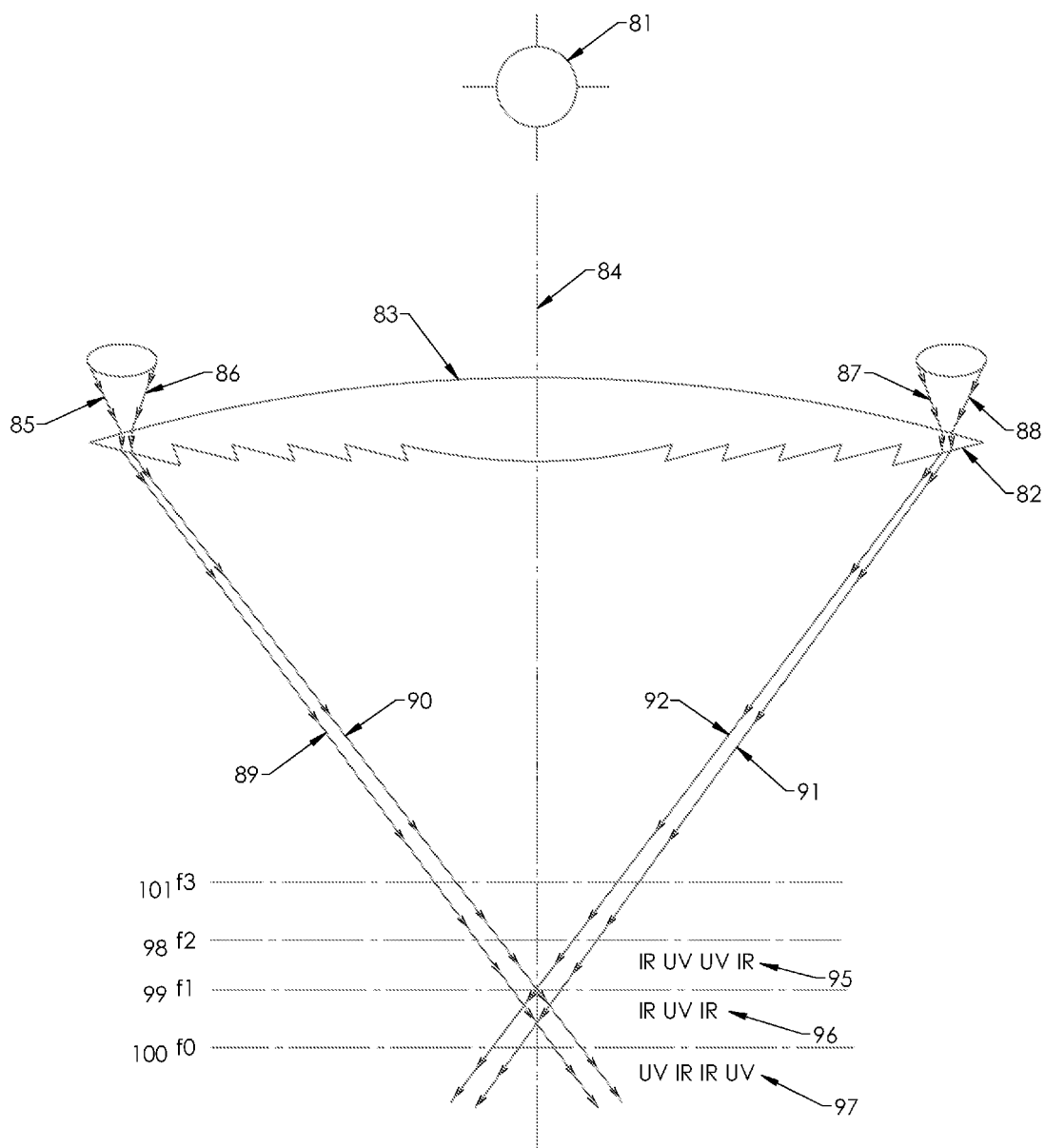
FIG. 3 is a view of an optical element and a receiver according to an embodiment of the present disclosure, with incident light rays from the sun.

As shown in FIG. 3, an embodiment of the present disclosure may intercept solar radiation from the apparent solar disk (81), and process that radiation for concentration and spectral distribution on a target to perform thermal, chemical or catalytic work. Solar radiation that impinge as a cone on the optical entrance surface (83) in extreme rays from the sun's disk (85), and the opposite side (86), each of these respective groups of rays contain short wavelength, long wavelength and intermediate wavelength radiation, and operating on those incident photons, and, with other photons collected by other prisms with short wavelength rays (87) and long wavelength rays (88) are operated on with other incident rays by refraction, and exit the exit surface (82) to converge on a target with selectable power density and chromatic distribution.

Integrating the refractive chromatic operation of the apparatus (80) along the concentric focal axis (84) resolves impinging photons into a short wavelength cone with edge rays (90) and (92) respectively, and a long wavelength cone with edge rays (89), and (91) respectively. Along the focal axis (84) the present embodiment provides the means and method to adjust the focal plane to shorter or longer than maximum power density. And, because the operating target is an area of a receiver, specific rings of energy may be directed toward specific area locations as the focal plane (96) providing the maximum mixing of wavelengths across the receiver. The present embodiment provides for positioning the receiver at a shorter focal plane (95), (98) producing a chromatic distribution with shorter wavelengths grouped about the center of the target plane, with longer wavelengths distributed about the edge. The present embodiment provides for positioning the target receiver at a longer focal length (97), (100) that produces the shorter wavelengths about the edges of the receiver, with the longer wavelength groups about the center. The present embodiment may be used in applications where an unusually short focal plane and focal length (101) are selected and may accommodate the receiver positioning along the optical focal axis (84) for applications including but not limited to energizing photo-chemical, photo-voltaic and photo-catalytic processes.

Figure 4:
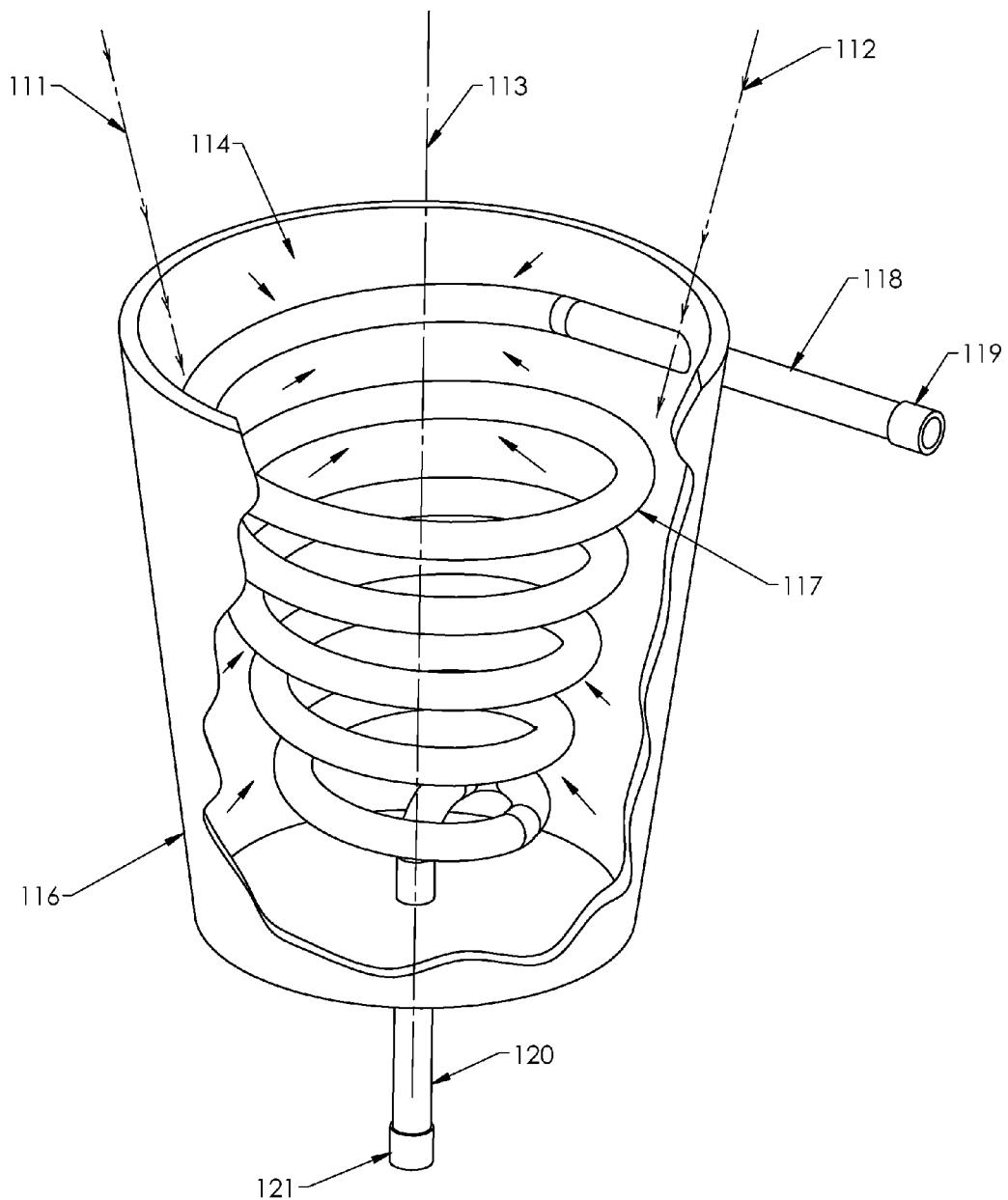
FIG. 4 is a view of a receiver according to an embodiment of the present disclosure.

As shown in FIG. 4, the solar optical energy, processed as described above through selected refraction and concentration, may impinge on a target receiver (110) constructed according to one embodiment of the present disclosure that may be useful for photo thermal applications, as well as other applications. Along a focal axis (113), impinging solar radiation at normal, or near normal angles are converged through refraction arrays with extreme edge rays (111) and (112) that define the outside cone of cones of converging wavelength groups so processed by the optical elements described above.

A receiver (110) may include an entrance plate (114), which may be transparent and formed of Pyrex or other materials selected for providing efficient transmission of broad band electromagnetic radiation and preferably wavelengths from UV B range 280 nm to 315 nm. Radiation may also include longer wavelengths through infra red B at 1400 nm to 3000 nm. Plate (114) may be a transparent cover glass that separates the outside environment from the internal absorber and or converter surfaces. A housing (115) may support cover glass (114) and provide mechanical support and integrity as a housing. Around this housing a suitable and selected insulator (116) may be incorporated to isolate and minimize emissivity losses from high temperatures achieved in the receiver. An entrance valve (121) may control input flow of a working fluid or gas through a channel (120) into the bottom of the receiver. Channel (120) may spiral upward and radially outward from the focal axis (113) to form an internal cone of tubing that acts as the absorber of the incident solar radiation of selected wavelengths and wavelength distribution. The working fluid may enter the receiver through channel (120) and travel up through the receiver, e.g., through a spiral portion of a tube (117), and exit the receiver through channel (118) to an exit valve (119). Working fluids, and gases may be operated on by the receiver directly optically, and thermally if tube (117) is selected to be transparent, or thermally if tube (117) is opaque. Working fluids and gasses are subject to rapid temperature and pressure rise resulting in photo thermal, photochemical or photo catalytic reactions as selected by the receiver composition.

As shown in FIG. 5, an embodiment of the present disclosure includes a receiver (130) that provides a method and apparatus to subject working fluids and gasses to extremely high levels of optical irradiation. Those learned in the art will appreciate the high power densities that embodiments of the present disclosure may produce under controlled conditions. Receivers including, but not limited to (130), may preferably be used in applications for photochemical and photo catalytic work. In such embodiments, incident solar radiation may be directed toward a receiver cover plate made of Pyrex (133), or other suitable materials to transmit, under stable continuity, high power solar flux. Working fluid, solid, or gasses may be introduced through an entrance valve (131) and directed under control through a constricting flange (132) to a series of tubes (134), (135), and (136) respectively positioned under the entrance plate (133) receiving the concentrated solar flux from the optical elements described above.

Sections of the tubes (137), made from quartz or Pyrex (138), reveal the working fluids optically to the solar flux entering through the cover glass (133) while keeping a high pressure internal environment. Irradiated working fluids are subject to high UV B power densities in selected wavelengths from 280 nm to 315 nm and drive photochemical and photo catalytic processes that reduce organics into degradation products.

As shown in FIG. 5a, entrance port (150) of a tube bundle (149) may be oriented laterally (148) across the receiver, shown in top view, where individual tubes including, but not limited to (145), (146) and (147), may expose the working fluids or gases to concentrated solar irradiance. Tube bundles (144) may be arranged to exit the receiver through an exit valve (143). A cover plate made from quartz, or Pyrex, or other suitable materials protect the internal reaction chambers including but not limited to (145), (146), and (147) from the external environment.

Figure 6:
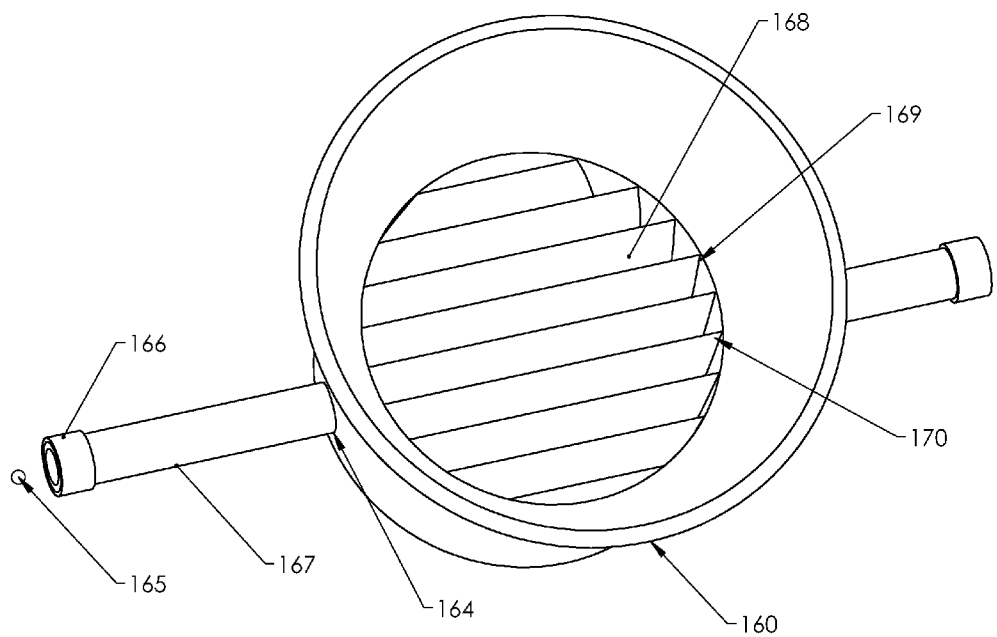
FIG. 6 is a view of a receiver according to an embodiment of the present disclosure.

As shown in FIG. 6, a receiver (160) may be provided for driving useful photo-thermal, photo-chemical and photo-catalytic processes. Solar radiation processed by an optical system described above may produce converging groups of wavelengths of solar radiation upon a receiver (160). A working fluid, solid, or gas, or combination thereof (165) may enter the receiver through a portal (166) and be directed through a channel (167) into a receiver reactor (164). The receiver may be covered with a suitable cover plate made from quartz or Pyrex, or other suitable material to provide high transmissivity of high power short wavelength, visible and short infra red radiation as may be processed and concentrated by an optical system. Receiver (160) may be formed with baffles including but not limited to (168), (169), and (170) and absorb radiation with increased surface area.

Photo catalytic semiconductors such as TiO2, and ZnO may be diffused onto the surface of the baffles including (168), (169), and (170), respectively. Photo-catalysts, when irradiated with photons of energy equal to, or greater than, the Band Gap of the semi-conductor, approximately 3.0 eV for TiO2, a preferred semi-conductor photo catalyst, produce electrons-hole pairs. These electron-hole pairs either recombine, or become available to participate in Oxidation-Reduction reactions with organic molecules in aqueous solution. The electrons interact with dissolved oxygen producing a negative species of oxygen, which is very reactive with organic molecules in a reduction half-reaction. The positive-holes produce an interaction with Water molecules, and hydroxyl groups, to produce Hydroxyl Radicals, which react with organic molecules aggressively to produce oxidation degradation products.

Figure 6A:
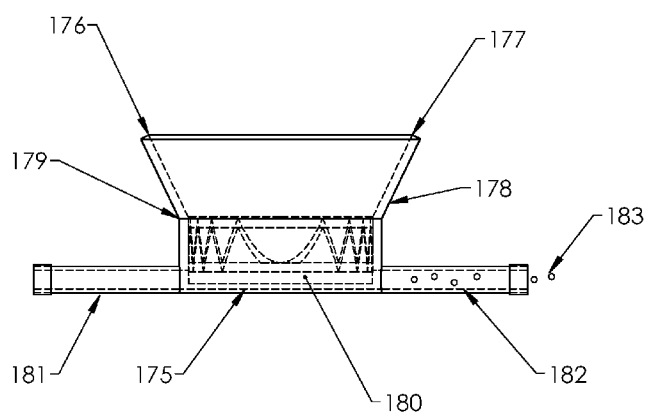
FIGS. 6a and 6b are front and side views of a receiver according to an embodiment of the present disclosure.
Figure 6B:
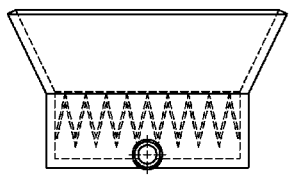

As shown in FIGS. 6a and 6b, solar radiation (176) and (177), as extreme rays processed by an optical system, impinges on the receiver (175). A reflective non-imaging reflector (178) may control off-axis rays by directing them toward the receiver cover plate (179), upon which incident radiation impinges from the refractive array. The short wavelengths concentrated by the refractive array described above from 280 nm to 315 nm in the ultra violet B range can cause direct dissociation of chemical bonds, in addition to photo-thermal processes that produce degradation products. Organic molecules in aqueous solution (181) may enter the receiver (175) and pass along the baffles (180) or other suitable surfaces with semi-conductor surface diffusion, and exit the reactor along channel (182) with degradation products exiting through (183). Those learned in the art will appreciate the high temperatures, pressures, and wavelength specific photo flux densities achieved by embodiments of the present disclosure.

As shown in FIGS. 7, 7a, 7b, and 7c, an apparatus (190) may provide the mechanical means of deploying, supporting, orienting, and actuating the hardware that directs the optical system toward the sun with high accuracy and control. A system (206), shown in FIG. 7a, may include a weather station with a directional pyrometer (209) with leads into a control panel (213) to determine solar position. Further sensors may include a wind velocity anemometer (207) supported on appropriate tower (212), and a solar panel (208), to produce environmental data that feeds into the controller (213). Controller (213) may be equipped with suitable programmable logic controllers that alert the controller to an extreme weather event that directs the assembly (215) to move to a stow position, as shown in FIG. 7b. An apparatus (191), as shown in FIG. 7, may provide for the optical system (204) to be supported by longitudinal stress bearing member (201), and (200) which connect to an altitude axis (203). Member support struts (199), and (202) may connect to an actuator (198) that controls the altitude of the optical system (204). A base plate (197) may be equipped with a slewing bearing (196) to provide actuation for azimuth position. The assembly may receive information from the weather and environmental station and may be controlled in two axis in terms of azimuth angle, and altitude angle. Support footings (194), (192), (193), and (195) may connect to the azimuth support drive and provide a wide base to maintain an accurate and secure footing.

An apparatus (230) may include the base footings supporting the azimuth drive assembly (233) and altitude drive assembly for adjusting the orientation of the lever arms (232) to orient the solar refractive array (231) to track the sun, preferably within a tolerance of 0.75 degree of arc to 1.5 degrees. Such structure may be designed to support the dynamic and static loads of the apparatus. Dynamic loads may be controlled to high precision with mechanical advantage using embodiments of the present disclosure.

Figure 8:
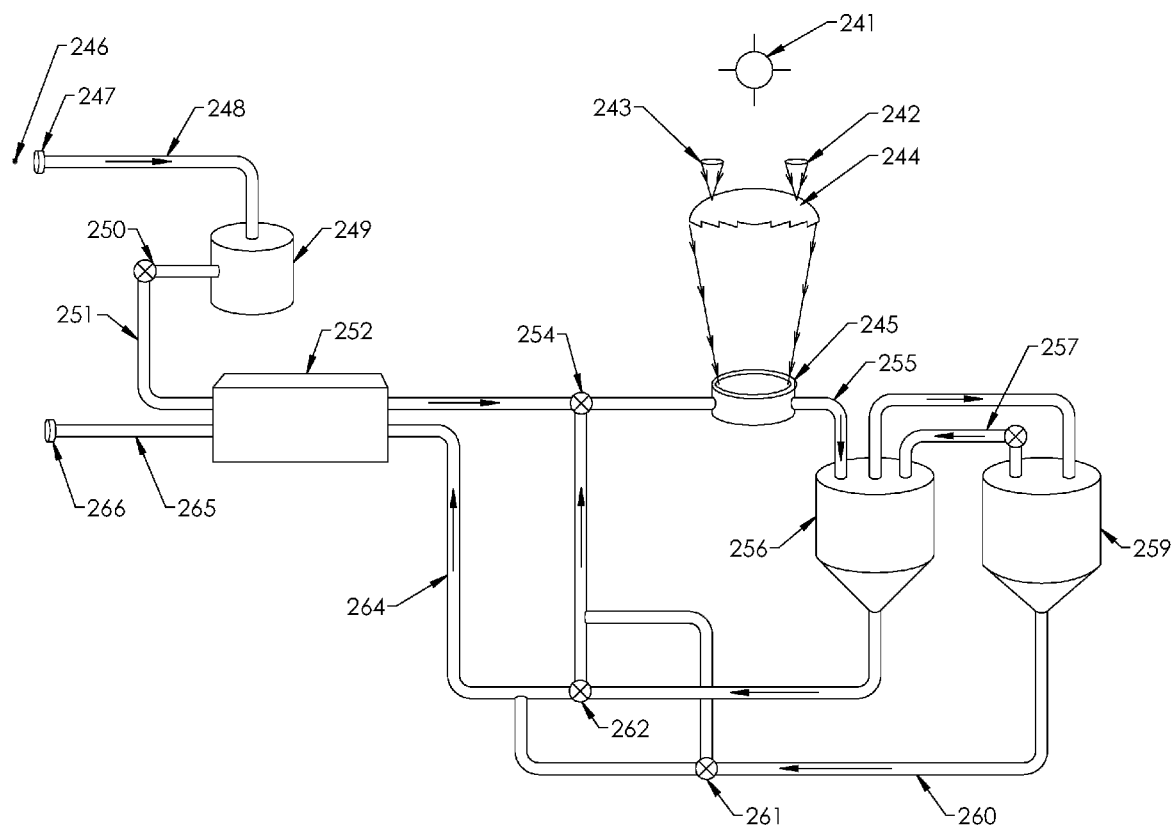
FIG. 8 is a view of a system with an optical element and a receiver according to an embodiment of the present disclosure, with incident light rays from the sun and controls for processing of materials in the system.

As shown in FIG. 8, an apparatus (240) may collect, refractively process, and concentrate solar photon flux, preferably including wavelengths of ultra-violet B 280 nm through infra-red A of 700 nm to 1,400 nm, in a controlled manner to select the photon flux density across a receiver, and to control, with use of focal plane adjustment of the receiver, the chromatic distribution of wavelength groups across the receiver. Embodiments of the present disclosure provide for photo-chemical and photo-catalytic processes to perform useful work such as decomposing organic pollutant compounds.

The embodiments of present disclosure may use the high photon flux density produced by the refractive array, per wavelength, to operate directly on organic chemical bonds of materials (246) including solids, liquid, and gasses that are introduced into the receiver reactor chamber to be decomposed, and irradiating those bonds with short-wavelength radiation including any UV-C from 100 nm to 280 nm, UV-B at 280 nm to 315 nm and UV-A from 315 nm to 400 nm as may be present in the raw solar radiation impinging. The apparatus (240) in this embodiment operates in this direct photo-chemical, and photo-catalytic action, and also imparts great increases in thermal energy available to the endothermic reactions that decompose organic compounds.

Organic pollutants in aqueous solution, or gaseous state preferably enter the apparatus (240) under control of temperature and pressure through access valve (247) to be directed by piping or channel (248) into a settling tank (249). From this reservoir a selected volume of material pollutants (246) may be pumped (250) through a channel (251) through a heat-exchanger (252) where heat is gained by the working fluid from the exit piping (264) when not working fluid is emptied from the system. The working fluid (246) may be further transferred from the heat-exchanger (252) and pumped (254) under controlled pressure and temperature into the receiver photo-reaction chamber (245). The apparatus may use a refractive array (244) to capture, and control those incident rays toward a suitable receiver through refraction, to perform work. Solar energy (241) is received by the optical refractive array collector as cones of photon flux (243), and (242), respectively, and consist of a mid-point ray, and conical edge-rays. Apparatus (240) optically processes those rays into a selected photon flux density, per wavelengths, and selects the chromatic distribution on the receiver.

The working fluid (246) is preferably subjected to high photon flux density in ultra-violet range, as well as the visible and near infra-red. The high short-wave radiation in the reaction chamber (245) directly saturates chemical bonds and acts to degrade organic molecules into degradation products, lowering toxicity. The working fluid (246) typically undergoes rapid temperature rise and exits the reaction chamber receiver (245) through channel (255) into a hot reservoir (256) where temperatures are sustained. A secondary reservoir tank (259) may be connected to the primary tank (256) through valve controlled gas pipes (251) and interconnected by pumped plumbing (257). Thermal tanks (256), and (259), respectively, may be insulated as well as pipes transferring fluids within the apparatus.

The working fluid (246) may be circulated between tanks, and routed by valved channel (260) to return to the reactor chamber (245) for further photo-reactions. Controlled valves (261) and (262) may control the effluent from recycling through the reaction chamber (245), or route the effluent to exit the reaction area through channel (264). The working fluid (246) passes through the heat-exchanger (252) transferring thermal energy to the incoming working fluid entering the present invention through valve (247). The working fluid after passing through heat-exchanger (252) through channel (265) is directed by (266) control valve for exit. Those learned in the art will appreciate how the present invention processes and converts organic pollutants (246) into aqueous mineral acids, mineral salts, and CO2.

A method and apparatus according to an embodiment of the present disclosure may collect and optically process impinging solar radiation at normal, or near normal angles to concentrate and select the chromatic distribution and photo flux density of solar radiation on a receiver to drive photo-thermal, photo-chemical, and photo-catalytic work.

As shown in FIGS. 9, 9a, and 9b, a receiver (340) may provide for the thermal and ultra-violet wavelength group irradiation processing of solids for detoxification and thermal chemical processes. Those learned in the art will appreciate the high power density that embodiments of the present disclosure may produce under controlled conditions. Receiver (340) may be placed in a circular opening (337) in an azimuth-rotating platform (343). This opening may be provided by the open center of the slewing bearing, between the refractor elevating beam supports (335) and the elevating jack mount (336).

Incident solar radiation (338) may be directed toward the receiver cover (339), which is typically made of Pyrex, or borosilicate, or other materials suitable for transmitting, under stable continuity, high power solar flux. A solids delivery system (340) may be positioned beneath the cover (339). This system is configured to deliver working solids such as contaminated soils and other solids and subject them to activation by heat, and/or UV radiation. The solids may be placed (341) on a conveyer (342), which may deliver them to a bin (343). An auger (344) may lift the solids, through the middle of the receiver to the top of a cone (345) where they may be exposed to solar radiation as they flow down the cone (345). A paddle (346) may sweep the processed solids to a return tube (347) feeding a conveyer (348) discharging the processed solids. The receiver cover (339) may include an air supply tube (349) and process gas recovery tube (350). The gas may pass for subsequent reduction by conventional means and/or by subsequent solar energy means.

For processes utilizing heat only, the cover (339) may be a high temperature metal or ceramic, with a black heat absorption coating. Insulating means consisting of a hood, moving with the elevating and azimuth tracking structures, but allowing the solar radiation to contact the fixed cover, may be provided.

Figure 10:
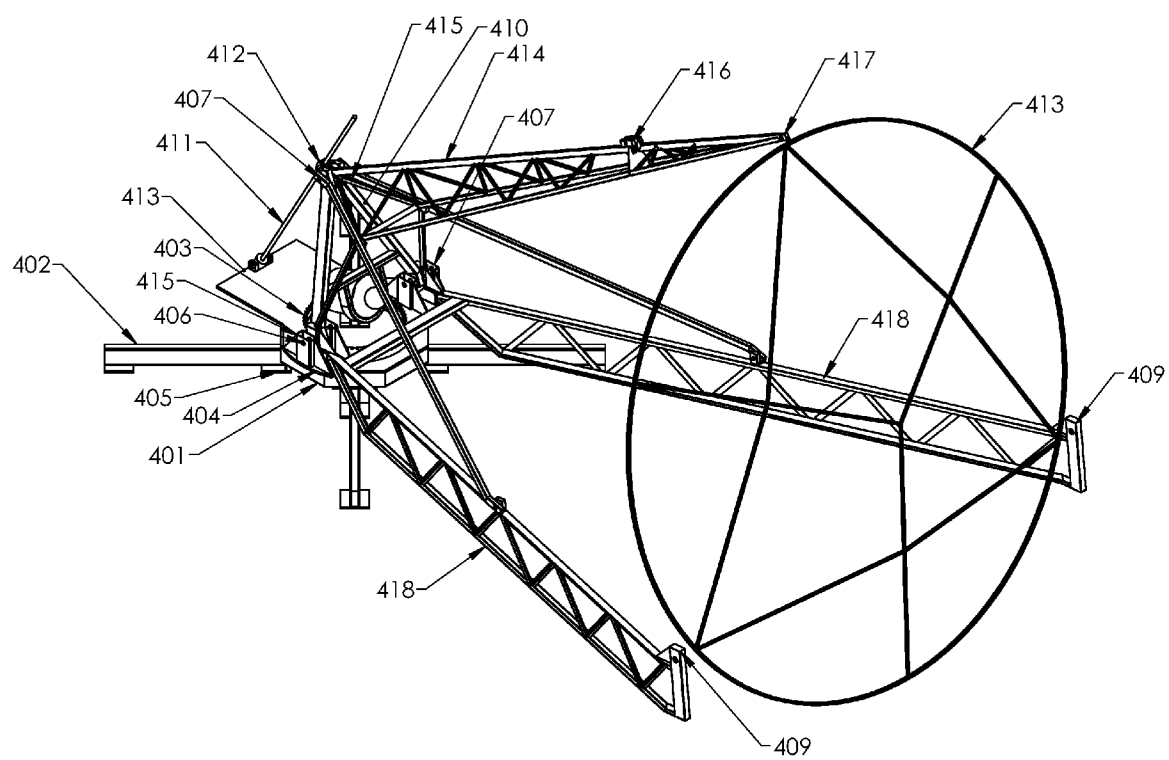

As shown in FIG. 10, an apparatus (400) may include a three arm tracking assembly with elevation and rotation drive. An embodiment of the present disclosure may provide for orienting and pointing a refractive optical element towards the sun when performing solar concentration, and retracting the optical element to a near horizontal attitude for maintenance, and high wind load mitigation. An embodiment of the present disclosure may provide for the focal area of the refracting optical element to be located at all periods of solar tracking in an opening near the ground.

A base (401) may provides support for this apparatus, with arm beams (402) extending out to provide a wide footprint. A platform (403) with a large central hole may be affixed to the arms, A large circular bearing centered on the hole may be affixed. A second platform (404) having a large central hole may be mounted on the rotating ring of the large bearing. Thus is provided a rotating platform with a large central opening to the ground beneath.

Supporting structure (405) may be mounted on the rotating platform on each side, outside the hole, (406) provides attachment, through shaft bearings (407) to an elevating and stowing assembly (408). Two elevating trusses (418) may run from the supporting structure to the refracting optical element (419) where they may be attached at a movable joint (409). Additional structural beams (410) affixed to the elevating trusses in a triangular manner provide a moment arm to the elevating actuator (411), e.g., a drive screw. The upper end of the elevating actuator (412) may be attached at this point, and the lower end is attached to the rotating platform (413). A stowing truss assembly (414) may be attached to the moment arm structure, and may extend to the upper edge of the optical element where it may be attached at a movable joint. This truss may include a base (415) attached to the moment arm at the lower end by a rotating joint. The upper end of the base may be pinned to the moment arm by a retractable pin. When this pin is retracted, a break joint (416) in the stowing truss (417) may allow the optical element to be rotated to a near horizontal position. The joints located at 406, 409, 412, 416, and 417 are typically moveable, and the joints at 418 are typically fixed.

Figure 11:
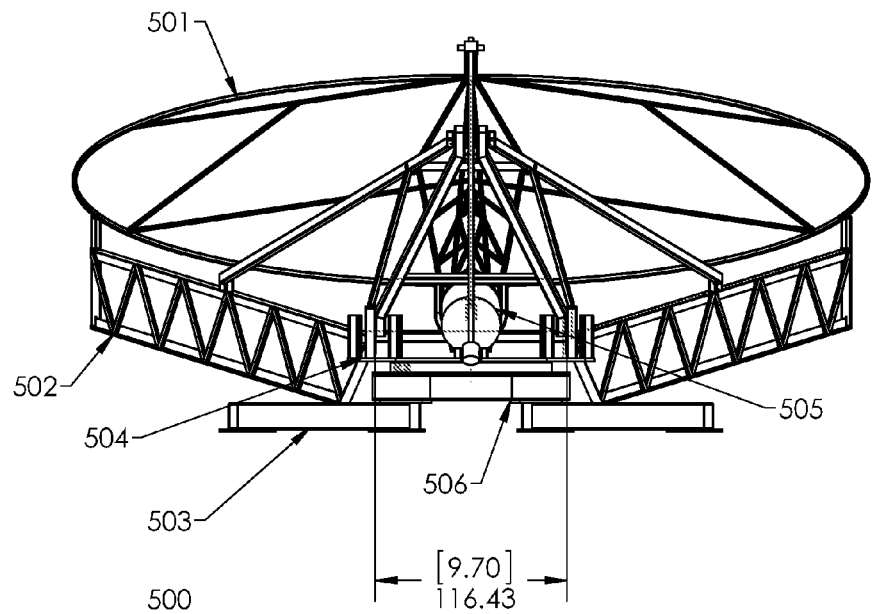

As shown in FIG. 11, an apparatus (500) may include an optical concentrator (501) supported and oriented by an assembly (502) similar to that disclosed above for FIG. 10. Footings and arm beams (503) may extend from hub assembly (504), similar to that described above, to support, orient, and maneuver the optical concentrator (501). Receiver (505) preferably converts the incident solar radiation into useful work driving photo-thermal, photo-chemical, and photo-catalytic reactions. The assembly (504) may include a wide stance bearing housing (506) giving increased stability under load.

Figure 11A:
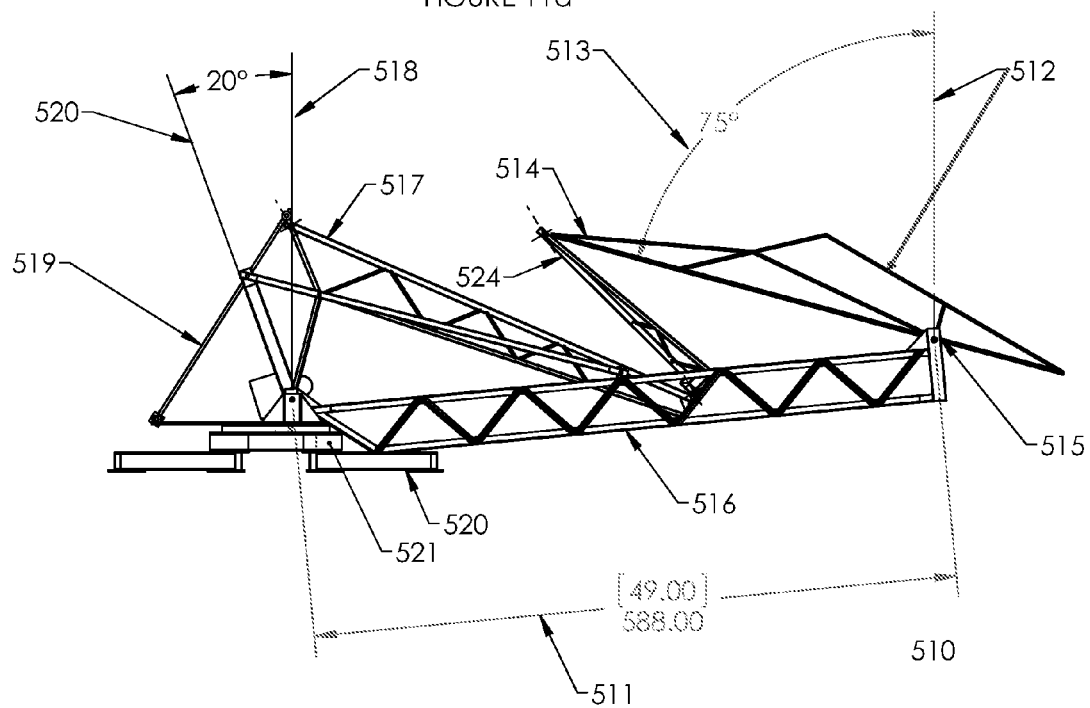

An apparatus (510), as shown in FIG. 11a, may be configured to provide a stowed position. A base assembly (520) may support a hub assembly (521) with extended members (516) over distance (511) that supports, maneuvers and orients the optically active elements (512). Rotatable about a movable joint (515), the normal plane of the optical element (512) may be adjustable through a range of angles (513) to a stow position (514). A support member (516) supports a truss (517) that acts on a truss section (524) that actuates the optical plane (512) under control. Actuator (519) controls the angle (513) of truss (517) with respect to truss (524), preferably providing a controllable optical plane capable of being actuated from a stow position to an active position normal to the sun, and all angles in between.

As shown in FIGS. 12 and 12a, an alternate method of providing a low wind profile stowing capability may be provided by a four bar apparatus (600). The elevating trusses (601) are typically as shown above in FIG. 11. The stow truss (414) in FIG. 11, may be replaced by two beams (602) parallel to the elevating trusses. These beams may attach to the refractor (603) with a movable joint (604) and to a movable joint (605) on a frame (606) above the elevating pivot (606) at a location preferably equal to the distance (607) between the lifting beam and parallel beam attachment to the refractor. The frame may be pinned (608) in a rigid manner to the elevating structure when tracking the sun. To stow, it may be unpinned and rotated counter clockwise about the elevating bearing support (609) and the upper beams may rotate down in a manner parallel to the elevating beams. By this motion, the refractor is rotated about the attachment to the elevating truss, to a near horizontal position.

An optical element for use in embodiments of the present disclosure may be a large refractor with a conical cross section for concentrating rays from the sun. The cone angle may be constant for the full refractor, or may be changed as the radius from the center increases. The slant angle may be determined by the internal refraction angle within the refractor material, based on the selected wavelength for preferred concentration. A flat refractor, where the sun ray is vertical to a front surface, typically refracts only at the exit from facet surfaces. With a slant or cone surface for the refractor, the ray enters the refractor material at an angle to the front surface and is refracted twice, once within the material and again at the exit from the facet. This allows the facet angle required for a selected exit ray to be less than that in a flat front surface refractor, which generally reduces internal losses.

In a forming mold, the facet "verticals" may be sloped to an angle based on the refraction angle of the selected design wavelength, because in a cone refractor the internal refraction angle is less than vertical to the front surface. This typically provides mold relief to aid removal of the refractor from the mold, and reduces shadowing and blocking between facets. Such slanting may also stiffen the lens for optical fixity and reduced wind load deflection. Optical elements according to the present disclosure may be formed integrally within a mold or assembled from components, or by other suitable means.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in any claims are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for photo-processing of a material using incident light from a source, the system comprising:
   a. a substantially transparent optical element, including a plurality of concentric bands of optical prisms concentric around a focal axis;
   b. a tracking assembly for orienting the optical element toward the source of the incident light;

c. a target receiver positioned on the focal axis and configured to hold the material to be photo-processed; and d. a slewing bearing defining a circular area, and wherein the tracking assembly is mounted on the slewing bearing for moving the optical element in azimuth, wherein the optical prisms concentrate incident light on the target receiver, and wherein the optical prisms receive and concentrate an input light onto the material to be photo-processed.

2. The system of claim 1 wherein the source of the incident light is the sun.

3. The system of claim 2 wherein the tracking assembly moves the optical element in azimuth and elevation to track the daily travel of the sun.

4. The system of claim 2 wherein the target receiver is fixed in location and the tracking assembly moves the optical element relative to the target receiver.

5. The system of claim 1 further including a delivery mechanism located adjacent the target receiver for delivering the material to the target receiver.

6. The system of claim 1 wherein the target receiver is positioned within the circular area defined by the slewing bearing.

7. The system of claim 1 wherein the system is installed at a ground level and wherein the slewing bearing is located substantially at the ground level.

8. A system for photo-processing of a material using incident light from a source, the system comprising:

a. a substantially transparent optical element, including a plurality of concentric bands of optical prisms concentric around a focal axis;

b. a tracking assembly for orienting the optical element toward the source of the incident light;

c. a target receiver positioned on the focal axis and configured to hold the material to be photo-processed, wherein the optical prisms concentrate incident light on the target receiver, and wherein the optical prisms receive and concentrate an input light onto the material to be photo-processed and wherein the tracking assembly includes three arms for mounting the optical element.

9. The system of claim 1 wherein the tracking assembly is retractable for maneuvering the optical element to a substantially horizontal attitude.

10. The system of claim 9 wherein the substantially horizontal attitude is a maintenance position.

11. A system for photo-processing of a material using solar light, the system comprising:

a. a substantially transparent optical element, including a plurality of concentric bands of optical prisms concentric around a focal axis, wherein each optical prism includes a set of properties of a depth, a width, an entrance angle, and an exit angle selected for concentrating a particular range of wavelengths of solar light;

b. a target receiver positioned on the focal axis and configured to hold the material to be photo-processed;

c. a tracking assembly for orienting the optical element toward the solar light during the daily travel of the sun; and d. a weather station with a directional pyrometer to determine solar position, wherein the optical prisms combine to concentrate a plurality of wavelengths of solar light on the target receiver for photo-processing of the material.

12. The system of claim 11 wherein the target receiver and the optical element are configured to provide photo-processing of the material, wherein such photo-processing involves at least one of photo-thermal, photo-catalytic, and UV processes.

13. The system of claim 12 wherein the target receiver and the optical element are configured to provide photo-processing of the material, wherein such photo-processing involves all of photo-thermal, photo-catalytic, and UV processes.

14. The system of claim 11 wherein the tracking assembly is retractable for maneuvering the optical element to a substantially horizontal attitude.

15. The system of claim 14 wherein the substantially horizontal attitude is a maintenance position.

16. A system for photo-processing of a material using solar light, wherein the material has a consistency selected from the group of semisolid and granular, the system comprising:

a. a substantially transparent optical element, including a plurality of concentric bands of optical prisms concentric around a focal axis, wherein each optical prism includes a set of properties of a depth, a width, an entrance angle, and an exit angle selected for concentrating a particular range of wavelengths of solar light;

b. a target receiver positioned on the focal axis;

c. a delivery mechanism located adjacent the target receiver for delivering the material to the target receiver, wherein the optical prisms combine to concentrate a plurality of wavelengths of solar light on the target receiver for photo-processing of the material, wherein the target receiver includes a cone, and the delivery mechanism delivers the material to the cone for photo-processing.

17. The system of claim 16 further comprising a tracking assembly for orienting the optical element toward the solar light during the daily travel of the sun.

18. The system of claim 16 wherein the delivery mechanism includes an auger for lifting the material to a top of the cone for photo-processing.

19. A system for photo-processing of a material using solar light, wherein the material has a consistency selected from the group of semisolid and granular, the system comprising:

a. a substantially transparent optical element, including a plurality of concentric bands of optical prisms concentric around a focal axis, wherein each optical prism includes a set of properties of a depth, a width, an entrance angle, and an exit angle selected for concentrating a particular range of wavelengths of solar light;

b. a target receiver positioned on the focal axis;

c. a delivery mechanism located adjacent the target receiver for delivering the material to the target receiver, wherein the optical prisms combine to concentrate a plurality of wavelengths of solar light on the target receiver for photo-processing of the material;

wherein the target receiver includes a process gas recovery tube for capturing gasses driven off of the material by photo-processing.

20. The system of claim 19 further comprising a tracking assembly for orienting the optical element toward the solar light during the daily travel of the sun.

* * * * *